(12) United States Patent
Kodama et al.

(10) Patent No.: US 9,389,427 B2
(45) Date of Patent: Jul. 12, 2016

(54) OPTICAL SYSTEM AND PROJECTION DISPLAY APPARATUS USING THE SAME

(71) Applicant: CANON KABUSHIKI KAISHA, Tokyo (JP)

(72) Inventors: Hiroyuki Kodama, Utsunomiya (JP); Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 13/869,334

(22) Filed: Apr. 24, 2013

(65) Prior Publication Data

US 2013/0286357 A1    Oct. 31, 2013

(30) Foreign Application Priority Data

Apr. 26, 2012   (JP) .................................. 2012-100504

(51) Int. Cl.
*G02B 27/14* (2006.01)
*H04N 9/31* (2006.01)
(Continued)

(52) U.S. Cl.
CPC .............. *G02B 27/141* (2013.01); *G02B 27/14* (2013.01); *G03B 21/2073* (2013.01); *G03B 33/12* (2013.01); *H04N 9/3105* (2013.01); *H04N 9/3167* (2013.01)

(58) Field of Classification Search
CPC ...................................................... H04N 9/3197
USPC .................. 353/81, 82, 94, 20, 30, 31; 349/9; 359/629
See application file for complete search history.

(56) References Cited

U.S. PATENT DOCUMENTS

| 6,789,902 | B2* | 9/2004 | Hayashi et al. | 353/20 |
| 7,950,809 | B2* | 5/2011 | Yamauchi et al. | 353/94 |
| 7,980,701 | B2* | 7/2011 | Kodama et al. | 353/20 |
| 2003/0001990 | A1* | 1/2003 | Magarill et al. | 349/96 |

(Continued)

FOREIGN PATENT DOCUMENTS

| CN | 101276017 A | 10/2008 |
| CN | 102291586 A | 12/2011 |

(Continued)

OTHER PUBLICATIONS

Chinese Office Action issued in Chinese counterpart application No. CN201310142235.X, dated Mar. 26, 2015. English translation provided.

(Continued)

*Primary Examiner* — William C Dowling
*Assistant Examiner* — Ryan Howard
(74) *Attorney, Agent, or Firm* — Rossi, Kimms & McDowell LLP

(57) ABSTRACT

An optical system is configured to introduce light modulated by a reflective light modulator to a projection lens configured to project the light onto a target plane. The optical system includes a polarization beam splitter configured to introduce each of first colored light as p-polarized light and second colored light as s-polarized light to a corresponding one of reflective optical modulators that are different from each other, and to synthesize light fluxes modulated by the reflective optical modulators with each other, a beam splitter arranged between the polarization beam splitter and the projection lens and configured to split the first colored light in accordance with a polarization direction of the first colored light and to transmit or reflect the second colored light irrespective of a polarization direction of the second colored light, and a half-wave plate arranged between the polarization beam splitter and the beam splitter.

12 Claims, 3 Drawing Sheets

(51) Int. Cl.
*G03B 21/20* (2006.01)
*G03B 33/12* (2006.01)

(56) References Cited

U.S. PATENT DOCUMENTS

| | | |
|---|---|---|
| 2003/0151725 A1 | 8/2003 | Hayashi et al. |
| 2006/0044516 A1 | 3/2006 | Inoko |

FOREIGN PATENT DOCUMENTS

| | | |
|---|---|---|
| JP | 2001154152 A | 6/2001 |
| JP | 2003233030 A | 8/2003 |
| JP | 2006071761 A | 3/2006 |
| JP | 2011059661 A | 3/2011 |
| JP | 2011095404 A | 5/2011 |
| JP | 2011221380 A | 11/2011 |

OTHER PUBLICATIONS

Official Action issued in Japanese Appln. No. 2012-100504 mailed Mar. 15, 2016.

* cited by examiner

OPTICAL SYSTEM AND PROJECTION DISPLAY APPARATUS USING THE SAME

BACKGROUND OF THE INVENTION

1. Field of the Invention

The present invention relates to an optical system and a projection display apparatus using the same.

2. Description of the Related Art

Japanese Patent Laid-Open No. ("JP") 2001-154152 discloses a color splitting and combining optical system using a wavelength selective polarization rotor between a reflective liquid crystal display ("LCD") element and a projection lens. However, the contrast lowers because the wavelength selective polarization rotor causes light in a polarization state different from a desired polarization state. Accordingly, JP 2006-071761 discloses an embodiment that does not arrange a wavelength selective polarization rotator between the LCD element and the projection lens utilizing, as a synthesizer of three colored light fluxes, an element that serves as a dichroic mirror for a certain wavelength range and to provide a polarization splitting and synthesizing characteristic for other wavelength ranges.

JP 2006-071761 arranges a wavelength selective polarizing plate that severs as a polarizing plate for a specific wavelength range between the LCD element and the projection lens, but the polarizing plate has a transmittance of about 80-90% and absorbs a large amount of light even in a transmitting axis direction. Due to the recent request for a higher brightness, the polarizing plate that absorbs a large amount of light causes to shorten the product life.

SUMMARY OF THE INVENTION

The present invention provides a durable optical system and a projection display apparatus that uses the optical system and can project a higher contrast image.

An optical system according to the present invention is configured to introduce light modulated by a reflective light modulator to a projection lens configured to project the light onto a target plane. The optical system includes a polarization beam splitter configured to introduce each of first colored light as p-polarized light and second colored light as s-polarized light to a corresponding one of reflective optical modulators that are different from each other, and to synthesize light fluxes modulated by the reflective optical modulators with each other, a beam splitter arranged between the polarization beam splitter and the projection lens and configured to split the first colored light in accordance with a polarization direction of the first colored light and to transmit or reflect the second colored light irrespective of a polarization direction of the second colored light; and a half-wave plate arranged between the polarization beam splitter and the beam splitter.

Further features of the present invention will become apparent from the following description of exemplary embodiments with reference to the attached drawings.

DESCRIPTION OF THE EMBODIMENTS

An optical system of this embodiment includes a polarization splitter configured to transmit first polarized light and reflect second polarized light, and a synthesizer configured to synthesize two colored light fluxes (such as red (R) colored light and blue (B) colored light) that have transmitted the polarization splitter, with another light flux (such as green (G) colored light). The polarization direction of the first polarized light flux is orthogonal to that of the second polarized light. For example, the first polarized light flux is p-polarized light, and the second polarized light flux is s-polarized light. The optical system of this embodiment introduces illumination light of a plurality of wavelength ranges to image modulators corresponding to light fluxes of the wavelength ranges, and synthesizes image light fluxes modulated by the image modulators at the synthesizer and introduces the synthesized light to the projection optical system. The synthesizer is arranged between the polarization splitter and the projection optical system.

The synthesizer introduces one of the first polarized light and the second polarized light to the projection optical system for one colored light flux (such as the R light flux) out of the two colored light fluxes from the polarization splitter. The projection optical system projects light from the synthesizer to a target plane. The synthesizer leads both the first polarized light and the second polarized light to the projection optical system for the other colored light flux (such as the B light flux) out of the two colored light fluxes from the polarization splitter.

In the black display that makes black the background color of the target plane, the polarization splitter removes the above two colored light fluxes through a transmission or a reflection, but the polarization splitting characteristic is imperfect. Accordingly, in order to help the removal of the polarization splitter, the prior art removes the one colored light introduced to the synthesizer utilizing the polarization splitting characteristic of the synthesizer, and removes the other colored light introduced to the synthesizer utilizing a polarizing plate that is arranged in front of the synthesizer.

This embodiment provides an optical system that can dispense with this polarizing plate, thereby projecting a high contrast image and improving the durability of the optical system. In order to sufficiently remove the other colored light in the black display state, this embodiment utilizes the polarization splitting characteristic of the polarization splitter for the second polarized light which is higher than the polarization splitting characteristic for the first polarized light. In other words, in the black display state, this embodiment introduces the other colored light to the polarization splitting surface in the second polarized light, and removes it by returning it to the light source side.

First Embodiment

Figure 1:
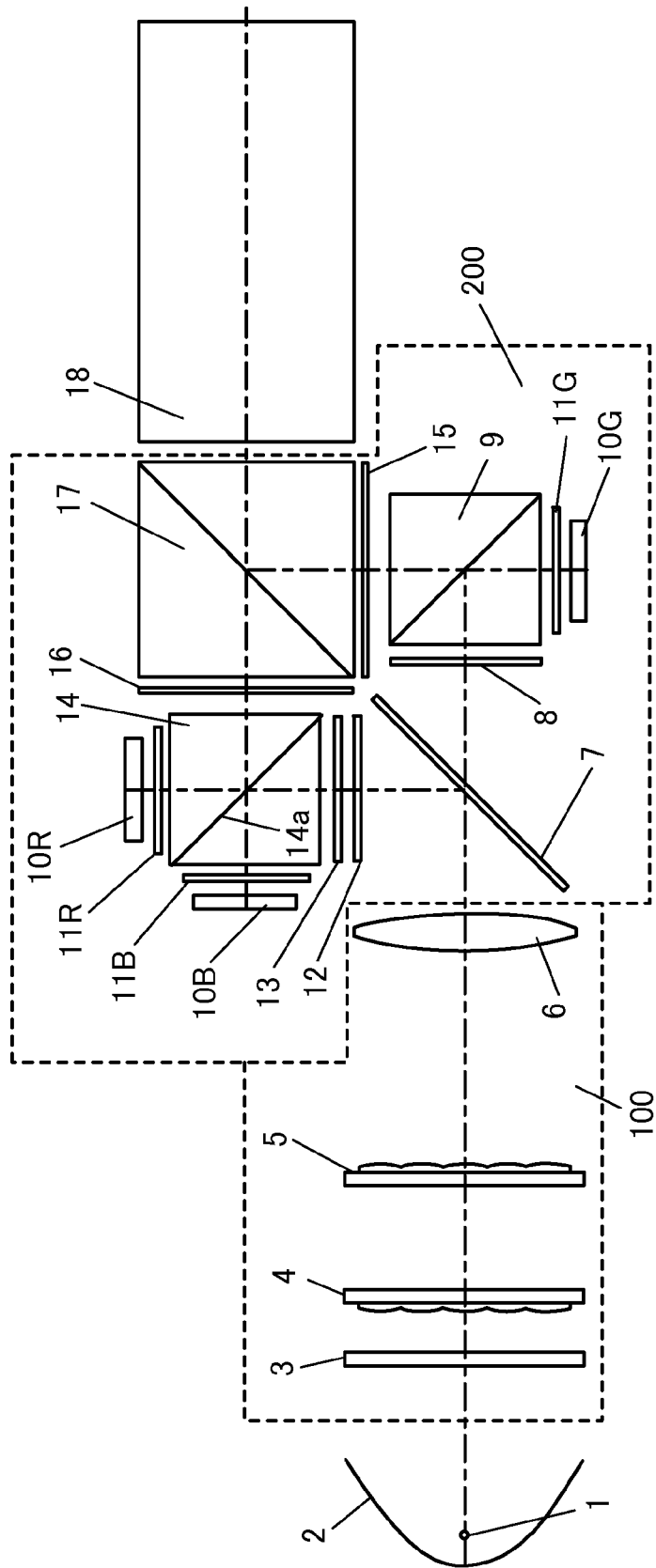
FIG. 1 is a block diagram of a projection display apparatus according to a first embodiment of the present invention.

FIG. 1 is a block diagram of a projection display apparatus (image projecting apparatus) according to a first embodiment. The projection display apparatus includes a light source unit, an illumination optical system 100, a color splitting and combining optical system 200, and a projection lens (projection optical system) 18.

The light source unit includes a light source 1 and a parabolic reflector 2. Light fluxes emitted in all directions from the light source (light emitting portion of the lamp) 1 are converted into approximately parallel light fluxes by the parabolic reflector 2 and emitted. The light source 1 of this embodiment is, but not limited to, an ultra-high pressure mercury lamp, and may be a LED and a laser light source.

The illumination optical system 100 illuminates a plurality of image modulators (reflective LCDs, reflective liquid crystal panels, or reflective light modulators), and includes an UV-IR (ultraviolet light-infrared light) filter 3, a first lens array 4, a second lens array 5, and a condenser lens 6. If necessary, the illumination optical system 100 may includes a unit configured to adjust the polarized light of the illumination light to the p-polarized light (first polarized light).

The parallel light flux from the parabolic reflector 2 enters the UV-IR filter 3, and is divided into a plurality of partial light fluxes by the first lens array 4. Each partial light flux or each divided light flux is condensed near the second lens array 5, and forms a light source image (secondary light source image). The divided light fluxes emitted from the second lens array 5 are condensed by the condenser lens 6, and illuminate the reflective LCD elements 10R, 10G, and 10B in a superposing manner.

The color splitting and combining optical system 200 includes a color splitter configured to split light into a plurality of color components, a light modulator configured to modulate and reflect a (colored) light flux of each color component in accordance with an image signal, and a synthesizer configured to synthesize modulated light fluxes of all color components.

The color splitter includes a dichroic mirror 7 and a second polarization beam splitter ("PBS") 14.

The dichroic mirror 7 reflects colored light of the blue wavelength range (B) and colored light of the red wavelength range (R), and transmits colored light of the green wavelength range (G). Each of the G colored light (light of the first wavelength range, light of the first color component, or the first colored light), the R colored light (light of the second wavelength range, light of the second color component, or the second colored light), and the B colored light (light of the third wavelength range, light of the third color component, and the third colored light) has a different wavelength range.

Reference numeral 8 denotes an incident side polarizing plate G configured to transmit the s-polarized light (second polarized light). Reference numeral 9 denotes a first PBS having a polarization splitting plane configured to transmit the p-polarized light and reflect the s-polarized light.

The light modulator includes an R reflective LCD element 10R, a G reflective LCD element 10G, and a B reflective LCD element 10B. Each LCD element serves as an image modulator (liquid crystal panel). Reference numeral 11R denotes an R quarter-wave plate, reference numeral 11G denotes a G quarter-wave plate, and 11B denotes a B quarter-wave plate. The R quarter-wave plate 11R is arranged between the second PBS 14 and the R reflective LCD element 10R. The G quarter-wave plate 11G is arranged between the first PBS 9 and the G reflective LCD element 10G. The B quarter-wave plate 11B is arranged between the second PBS 14 and the B reflective LCD element 10B.

Reference numeral 15 denotes a half-wave plate G configured to convert a polarization direction by 90°.

Reference numeral 12 denotes an incident side polarizing plate configured to transmit the s-polarized light. Reference numeral 13 is a color selective phase difference plate configured to convert the polarization direction of the R colored light by 90° and to maintain the polarization direction of the B colored light. The incident side polarizing plate 12 is arranged between the color selective phase difference plate 13 and the dichroic mirror 7.

The second PBS 14 has a polarization splitting characteristic for the R colored light and the B colored light. The second PBS 14 has a polarization splitting plane (polarization splitter) 14a configured to transmit the p-polarized light and to reflect the s-polarized light. The second PBS 14 serves to synthesize with each other the B and R colored light fluxes modulated and reflected by corresponding LCD elements and to guide the synthesized light flux to the combining prism 17. The color selective phase difference plate 13 is arranged between the second PBS 14 and the incident side polarizing plate 12.

In this embodiment, the second PBS 14 transmits the p-polarized light of the R colored light as the light of the first wavelength range to the R reflective LCD element (first image modulator) 10R. The second PBS 14 reflects the s-polarized light of the B colored light as the light of the second wavelength range to the B reflective LCD element (second image modulator) 10B. The second PBS 14 has a multilayer film configured to reflect the s-polarized light of the R colored light modulated by the R reflective LCD element 10R, and to transmit the p-polarized light of the B colored light modulated by the B reflective LCD element 10B.

Reference numeral 16 denotes a half-wave plate ($\lambda/2$ plate or polarization direction converter) configured to convert the polarization direction by 90°, and arranged between the second PBS 14 and the combining prism 17. This embodiment arranges no polarizing plate that shields one of the p-polarized light and the s-polarized light of the G colored light and transmits the other of them between the combining prism 17 and the polarization splitting plane 14a. As a result, this embodiment can project a high contrast image, and improve the durability of the color splitting and combining optical system.

Figure 2:
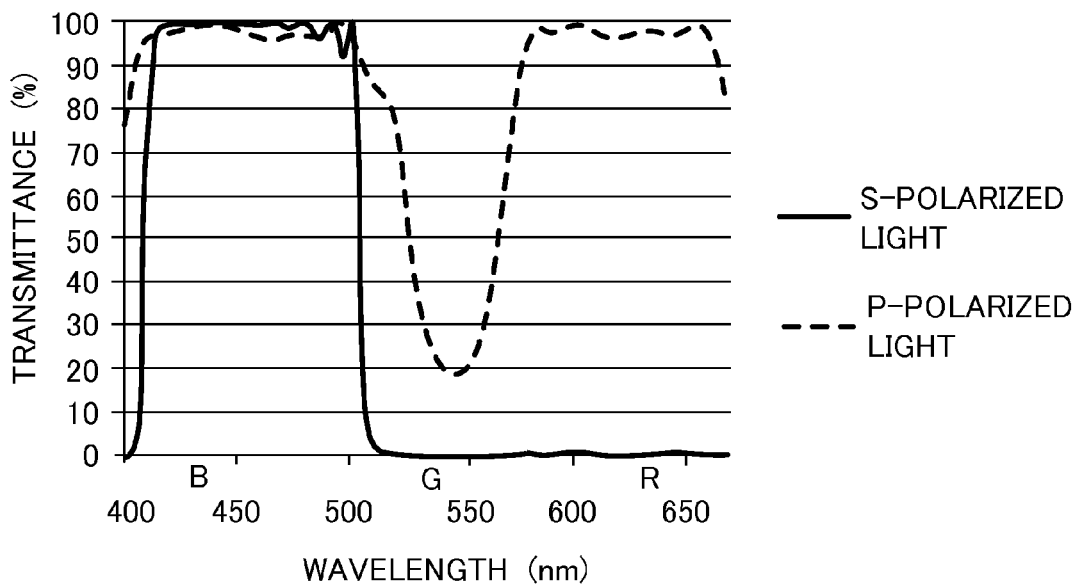
FIG. 2 is a graph illustrating a characteristic of a combining prism illustrated in FIG. 1 according to the first embodiment.

The combining prism 17 synthesizes the first colored light with the second and third colored light, and serves as a synthesizer. The combining prism 17 has an optical plane having a polarization splitting characteristic illustrated in FIG. 2, thereby serving as a dichroic mirror for the B and G colored light and as a PBS that transmits the p-polarized light and reflects the s-polarized light for the R colored light. FIG. 2 is a graph illustrating a relationship between the wavelength (nm) of the light incident upon the combining prism 17 (abscissa axis) and the transmittance (%) (ordinate axis).

In other words, the combining prism 17 reflects both the p-polarized light and the s-polarized light of the light of the first wavelength range (G colored light) to the projection lens 18. The combining prism 17 transmits the p-polarized light and reflects the s-polarized light for the second wavelength range (R colored light). The combining prism 17 leads one of the p-polarized light and the s-polarized light for the R colored light to the projection lens 18. The combining prism 17 leads both the p-polarized light and the s-polarized light for the light of the third wavelength range (B colored light) to the projection lens 18.

The projection lens 18 is a projection unit (projection optical system) configured to project light synthesized by the combining prism 17 to the target plane (not illustrated).

Next follows a description of an optical operation of the color splitting and combining optical system 200.

For the G colored light that has transmitted the dichroic mirror 7, its s-polarized light transmits the incident side polarizing plate G8 and enters the first PBS 9. The s-polarized light is reflected on the polarization splitting plane of the PBS 9 to the G reflective LCD element 10G. In the G reflective LCD element 10G, the G colored light is modulated and reflected. The s-polarized light component of the G reflected light that has been modulated is reflected on the polarization splitting plane of the PBS 9 back to the light source side, and removed from the projection light. On the other hand, the p-polarized light of the G reflected light that has been modulated transmits the polarization splitting plane of the PBS 9, is converted from the p-polarized light to the s-polarized light by the half-wave plate G15, and goes to the combining prism 17. In the (black displaying) state in which all polarized light components are converted into the s-polarized light, the fast or slow axis of the quarter-wave plate 11G is adjusted to a direction approximately perpendicular to the plane that contains the incident optical axis upon the first PBS 9 and the reflection optical axis. Thereby, the influence of the disturbance of the polarization state that occurs in the first PBS 9 and the G reflective LCD element 10G can be reduced. The G colored light emitted from the first PBS 9 is converted from the p-polarized light to the s-polarized light by the half-wave plate G15, and is reflected by the combining prism 17 to the projection lens 18.

The R and B colored light reflected by the dichroic mirror 7 enters the incident side polarizing plate 12 that is configured to transmit the s-polarized light. Next, the R and B colored light emitted from the incident side polarizing plate 12 enters the color selective phase difference plate 13. The color selective phase difference plate 13 serves to rotate the polarization direction of the R colored light by 90°. As a consequence, the R colored light as the p-polarized light enters the second PBS 14, and the B colored light as s-polarized light enters the second PBS 14. The B colored light that is incident as the s-polarized light upon the second PBS 14 is reflected on the polarization splitting plane of the second PBS 14 to the B reflective LCD element 10B. The R colored light that is incident as the p-polarized light upon the second PBS 14 transmits the polarization splitting plane of the second PBS 14 to the R reflective LCD element 10R.

The B colored light incident upon the B reflective LCD element 10B is modulated and reflected. The s-polarized light component of the B colored light that has been modulated and reflected is again reflected upon the polarization splitting plane of the second PBS 14 back to the light source side, and removed from the projection light. On the other hand, the p-polarized light component of the B colored light that has been modulated and reflected transmits as the projection light through the polarization splitting plane of the second PBS 14 to the half-wave plate 16.

The R colored light incident upon the R reflective LCD element 10R is modulated and reflected. The p-polarized light component of the R colored light that has been modulated and reflected again transmits the polarization splitting plane of the second PBS 14 back to the light source side, and is removed from the projection light. On the other hand, the s-polarized light component of the R colored light that has been modulated and reflected is reflected as the projection light on the polarization splitting plane of the second PBS 14 to the half-wave plate 16.

In the black display for the R colored light and the B colored light, the slow axes of the quarter-wave plates 11R and 11B are adjusted as in the G colored light.

Thus, the R colored light and the B colored light synthesized into one light flux and emitted from the second PBS 14 enter the half-wave plate 16 in which the B colored light is incident as the p-polarized light and the R colored light is incident as the s-polarized light. The half-wave plate 16 converts the p-polarized light of the B colored light into the s-polarized light and the s-polarized light of the R colored light into the p-polarized light. The resultant R and B light transmits the combining prism 17, is synthesized with the G colored light, and goes to the projection lens 18.

The synthesized RGB projection light is enlarged and projected on the target plane, such as the screen, by the projection lens 18.

The optical paths of the reflective LCD elements have been thus described for the white display. Next follows a description of the optical paths of the reflective LCD elements for the black display.

The background color of the target plane is made white in the white display, and the background color of the target plane is made black in the black display.

The s-polarized light of the G colored light enters the first PBS 9, and is reflected on its polarization splitting plane to the G reflective LCD element 10G. Due to the black display of the reflective LCD element 10G, the G colored light is reflected without being modulated. Therefore, the s-polarized light of the G colored light is maintained even after it is reflected by the G reflective LCD element 10G. Then, this light is again reflected on the polarization splitting plane of the first PBS 9, transmits the incident side polarizing plate G8 back to the light source side, and is removed from the projection light.

The R and B colored light reflected by the dichroic mirror 7 enters the incident side polarizing plate 12 and the color selective phase difference plate in this order. Thereby, the R colored light is incident as the p-polarized light and the B colored light is incident as the s-polarized light upon the second PBS 14. The B colored light that is incident as the s-polarized light upon the second PBS 14 is reflected on the polarization splitting plane of the second PBS 14 to the B reflective LCD 10B. The R colored light that is incident as the p-polarized light upon the second PBS 14 transmits the polarization splitting plane of the second PBS 14 to the R reflective LCD 10R.

Due to the black display, the B colored light that has enters the B reflective LCD 10B is reflected as the s-polarized light without being modulated, is reflected on the polarization splitting plane of the second PBS 14, and transmits the color selective phase difference plate 13 and the incident side polarizing plate 12 back to the light source side. On the other hand, the R colored light that has enters the R reflective LCD element 10R is reflected as the p-polarized light without being modulated, transmits the polarization splitting plane of the second PBS 14, transmits the color selective phase difference plate 13 and the incident side polarizing plate 12 back to the light source side.

While the above description assumes that the PBS reflects 100% of the s-polarized light and transmits 100% of the p-polarized light, this ideal state cannot actually be acquired and a small amount of p-polarized light is reflected. In general, the polarization splitting characteristic of the PBS for the s-polarized light is superior to its polarization splitting characteristic for the p-polarized light.

In this configuration, the R colored light is incident as the p-polarized light upon the second PBS 14. In the black display, the p-polarized light is reflected from the R reflective LCD 10R and enters the second PBS 14. A small amount of p-polarized light is reflected to the half-wave plate 16, is converted from the p-polarized light to the s-polarized light, and enters the combining prism 17. Nevertheless, the combining prism 17 reflects the s-polarized light of the R colored light as illustrated in FIG. 2, and thus the R colored light does not go to the projection lens and the leak light can be restrained. In other words, the combining prism 17 helps the removal by the second PBS 14.

As illustrated in FIG. 2, the combining prism transmits the B colored light irrespective of its polarization state, and does not have a polarization splitting characteristic for the B colored light. In addition, since there is no polarizing plate, there is no optical element that supports the removal by the second PBS 14. Instead, the B colored light is incident as the s-polarized light upon the second PBS 14. In the black display, the s-polarized light is reflected on the B reflective LCD 10R, and enters the second PBS 14. The characteristic of the second PBS 14 of reflecting the s-polarized light is superior to the characteristic of transmitting the p-polarized light, and an amount of leak light that transmits the second PBS 14 to the combining prism 17 becomes very small.

The configuration of this embodiment can eliminate a less durable optical element, such as a polarizing plate for analyzing light, and can improve the durability and life of the product. Since the B colored light is analyzed only by the second PBS 14 (meaning that light of only a desired polarization state passes the second PBS 14), the transmittance may be 1% or less for the s-polarized light in the blue wavelength band.

The combining prism 17 may have a polarization splitting characteristic for the B colored light and transmit the R colored light irrespective of the polarization state of the R colored light, and the R and B reflective LCDs may be replaced with each other. Nevertheless, as in this embodiment, setting the B colored light that has a shorter wavelength than that of the R colored light to the colored light to be analyzed only by the second PBS 14 is advantageous in view of the spectral luminous efficiency.

Second Embodiment

Figure 3:
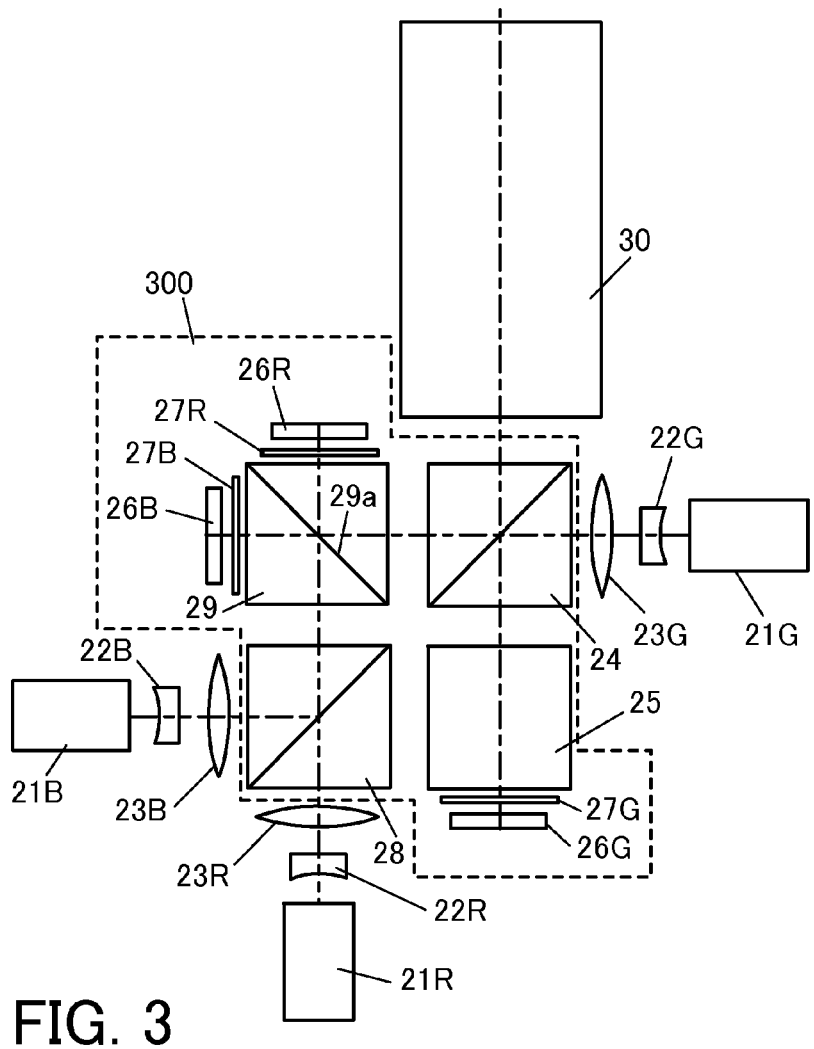
FIG. 3 is a block diagram of a projection display apparatus according to a second embodiment of the present invention.

FIG. 3 is a block diagram of a projection display apparatus according to a second embodiment. The projection display apparatus includes a light source unit, an illumination optical system, a color splitting and combining optical system 300, and a projection lens (projection optical system) 30.

The light source unit includes a laser light source 21R for the R light, a laser light source 21G for the G light, and a laser light source 21B for the B light.

The color splitting and combining optical system 300 includes a color splitter configured to split light into a plurality of color components, a light modulator configured to modulate and reflect (colored) light of each color component in accordance with an image signal, and a synthesizer configured to synthesize modulated light fluxes of all color components. The color splitting and combining optical system 300 is configured to generate s-polarized light of the B light, s-polarized light of the G light, and p-polarized light of the R light. The wavelength bands of these light sources are set to 630-650 nm for the R light, 520-540 nm for the G light, and 435-445 nm for the B light.

The illumination optical system illuminates a display area on an image modulator (reflective LCD element or reflective liquid crystal panel), and includes concave lenses 22R, 22G, and 22B, and convex lenses 23R, 23G, and 23B. The light fluxes emitted from the laser light sources 21R, 21G, and 21B are enlarged by the concave lenses 22R, 22G, and 22B, and convex lenses 23R, 23G, and 23B.

The color splitter includes a PBS RB29. The light modulator includes an R reflective LCD 26R, a G reflective LCD 26G, and a B reflective LCD 26B. The synthesizer includes a combining prism 24.

Figure 4:
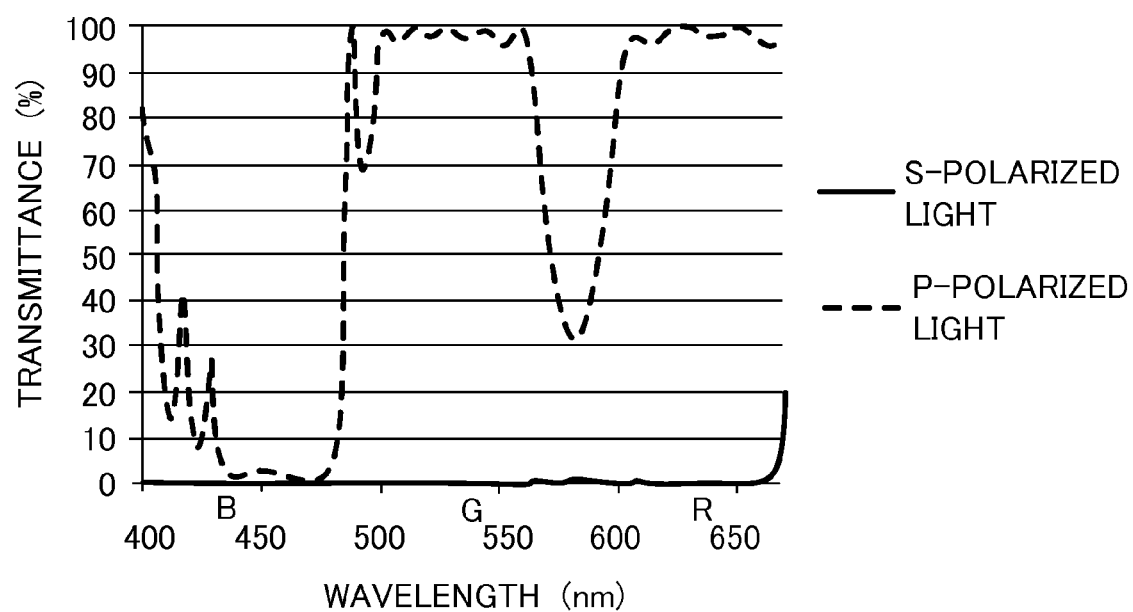
FIG. 4 is a graph illustrating a characteristic of a combining prism illustrated in FIG. 3 according to the second embodiment.

The combining prism 24 is a prism illustrated in FIG. 4 which has a polarization splitting characteristic for the G colored light and the R colored light, and has a characteristic of reflecting the B colored light irrespective of the polarization state of the B colored light. FIG. 4 is a graph illustrating a relationship between the wavelength (nm) of the light incident upon the combining prism 24 (abscissa axis) and the transmittance (%) (ordinate axis).

Reference numeral 27R denotes an R quarter-wave plate, reference numeral 27G denotes a G quarter-wave plate, and reference numeral 27B denotes a B quarter-wave plate. The R quarter-wave plate 27R is arranged between the PBS RB29 and the R reflective LCD element 26R. The G quarter-wave plate 27G is arranged between an optical-path-length correcting plate 25 and the G reflective LCD element 26G. The B quarter-wave plate 27B is arranged between the PBS RB29 and the B reflective LCD element 26B. The optical-path-length correcting plate 25 is a rectangular pole prism configured to equalize the optical path lengths of the projection lens 30 and each of the reflective LCD elements 26R, 26G, and 26B.

The PBS RB29 has an optical plane (polarization splitter) having a polarization splitting characteristic for synthesizing the R light and the B light with each other. The optical plane 29a transmits the p-polarized light and reflects the s-polarized light. This embodiment arranges no polarizing plate that shields one of the p-polarized light and the s-polarized light of the G colored light and transmits the other of them between the combining prism 24 and the optical plane 29a. As a result, this embodiment can project a high contrast image, and improve the durability of the color splitting and combining optical system.

The projection lens 30 is a projection unit configured to project light fluxes synthesized by the combining prism 24 onto the target plane (not illustrated).

Next follows a description of an optical operation of the color splitting and combining optical system 300.

The s-polarized light of the G colored light that has transmitted the combining prism 24 from the side opposite to that of the R light and the B light is reflected by the combining prism 24 as illustrated in FIG. 4, and transmits the optical-path-length correcting plate 25 to the G reflective LCD element 26G. In the G reflective LCD element 26G, the G colored light is modulated and reflected. The s-polarized light component of the G colored light that has been modulated and reflected transmits the optical-path-length correcting plate 25, is again reflected on the polarization splitting plane of the combining prism 24 back to the light source side, and is removed from the projection light. On the other hand, the p-polarized light of the G colored light that has been modulated and reflected transmits the optical-path-length correcting plate 25 and the polarization splitting plane of the combining prism 24. In the (black displaying) state in which all polarized light components are converted into the s-polarized light, the fast or slow axis of the quarter-wave plate 27G is adjusted to a direction approximately perpendicular to the plane that contains the incident optical axis upon the combining prism 24 and the reflection optical axis. Thereby, the influence of the disturbance of the polarization state that occurs in the combining prism 24 and the G reflective LCD element 26G can be reduced. The G colored light emitted from the combining prism 24 goes to the projection lens 30.

The s-polarized light of the B colored light is reflected on the polarization splitting plane of the RB combining prism 28, enters the PBS RB29, and is reflected by the polarization splitting plane of the PBS RB29 to the B reflective LCD element 26B. The B colored light that has entered the B reflective LCD element 26B is modulated and reflected. The s-polarized light component of the B colored light that has been modulated and reflected is again reflected on the polarization splitting plane 29a of the PBS RB29 back to the light source side, and removed from the projection light. On the other hand, the p-polarized light of the B colored light that has been modulated and reflected transmits the polarization splitting plane 29a of the PBS RB29, and goes as projection light to the combining prism 24.

The p-polarized light of the R colored light enters the RB combining prism 28, and transmits its polarization splitting plane. The R colored light that has entered the PBS RB29 transmits the polarization splitting plane of the PBS RB29 to the R reflective LCD element 26R. The R colored light that has entered the R reflective LCD element 26R is modulated and reflected. The p-polarized light component of the R colored light that has been modulated and reflected again transmits the polarization splitting plane 29a of the PBS RB29 back to the light source side, and is removed from the projection light. On the other hand, the s-polarized light of the R colored light that has been modulated and reflected is reflected on the polarization splitting plane 29a of the PBS RB29 and goes as projection light to the combining prism 24.

In the black display for the R colored light and the B colored light, the slow axes of the quarter-wave plates 27R and 27B are adjusted as in the G colored light.

Thus, the R colored light and the B colored light synthesized into one light flux and emitted from the PBS RB29 enter the combining prism 24 in which the B colored light is incident as the p-polarized light and the R colored light is incident as the s-polarized light. The combining prism 24 reflects the RB projection light and synthesizes it with the G colored light. The resultant light goes to the projection lens 30.

The optical paths of the reflective LCD elements have been thus described for the white display. Next follows a description of the optical paths of the reflective LCD elements for the black display.

The s-polarized light of the G colored light enters the combining prism 24, and is reflected by its polarization splitting plane to the G reflective LCD element 26G via the optical-path-length correcting plate 25. Due to the black display of the reflective LCD element 26G, the G colored light is reflected without being modulated. Therefore, the s-polarized light of the G colored light is maintained even after it is reflected by the reflective LCD element 26G, again reflected on the polarization splitting plane of the combining prism 24 via the optical-path-length correcting plate 25 back to the light source side, and removed from the projection light.

The RB colored light emitted from the RB combining prism 28 enters the PBS RB29 in which the R colored light is incident as the p-polarized light and the B colored light is incident as the s-polarized light. The B colored light that is incident as the s-polarized light upon the PBS RB29 is reflected on the polarization splitting plane of the PBS RB29 to the B reflective LCD element 26B. The R colored light that is incident as the p-polarized light upon the PBS RB29 transmits the polarization splitting plane of the PBS RB29 to the R reflective LCD element 26R. Due to the black display of the B reflective LCD element 26B, the B colored light that has enters the B reflective LCD 26B is reflected without being modulated. Thus, the s-polarized light of the B colored light is maintained even after it is reflected on the B reflective LCD element 26B, reflected on the polarization splitting plane of the PBS RB 29 back to the light source side, and removed from the projection light for the black display. On the other hand, the R colored light that has enters the R reflective LCD element 26R is reflected without being modulated since the R reflective LCD element 26R displays black. Therefore, the p-polarized light of the R colored light is maintained even after it is reflected on the R reflective LCD element 26R again transmits the polarization splitting plane of the PBS RB 29 back to the light source side, and is removed from the projection light.

The combining prism 24 serves as the first PBS 9 and the combining prism 17 of the first embodiment. This embodiment provides an effect similar to that of the first embodiment when the R colored light for which the combining prism 24 has a polarization splitting characteristic is incident as the p-polarized light upon the PBS RB29, and when the B colored light for which the combining prism does not have a polarization splitting characteristic is incident as the s-polarized light upon the PBS RB 29.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100504, filed Apr. 26, 2012 which is hereby incorporated by reference herein in its entirety.

What is claimed is:

1. An optical system configured to guide light modulated by a reflective light modulator to a projection lens configured to project the light onto a target plane, the optical system comprising:
    a polarization beam splitter configured to guide each of first colored light as p-polarized light and second colored light as s-polarized light to a corresponding one of reflective optical modulators that are different from each other, and to synthesize light fluxes modulated by the reflective optical modulators with each other;
    a beam splitter arranged between the polarization beam splitter and the projection lens and configured to split the first colored light in accordance with a polarization direction of the first colored light and to transmit or reflect the second colored light irrespective of a polarization direction of the second colored light; and
    a half-wave plate arranged between the polarization beam splitter and the beam splitter,
    wherein the first colored light is light having a wavelength longer than that of the second colored light.

2. The optical system according to claim 1, wherein the beam splitter transmits the second colored light to the projection lens.

3. The optical system according to claim 1, further comprising:
    a dichroic mirror configured to split light from a light source into a set of the first colored light and the second colored light, and third colored light; and
    a second polarization beam splitter which the third colored light that has been split by the dichroic mirror enters,
    wherein the third colored light incident upon the second polarization beam splitter is guided to and modulated by a reflective light modulator corresponding to the third colored light, and the third colored light that has been modulated is guided to the projection lens by the beam splitter.

4. The optical system according to claim 3, wherein the third colored light is reflected by the beam splitter and guided to the projection lens.

5. The optical system according to claim 3, further comprising:
    a first polarizing plate arranged between the dichroic mirror and the polarization beam splitter, and
    a color selective phase difference plate arranged between the first polarizing plate and the polarization beam splitter and that is configured to convert the polarization direction of the first colored light and to maintain the polarization direction of the second colored light.

6. The optical system according to claim 3, further comprising:
a second polarizing plate arranged between the dichroic mirror and the second polarization beam splitter, and
a second half-wave plate arranged between the second polarization beam splitter and the beam splitter.

7. A projection display apparatus comprising:
a plurality of reflective light modulators each configured to modulate light, the reflective light modulators being different from each other;
a projection lens configured to project the light modulated by each reflective light modulator onto a target plane; and
an optical system configured to guide the light modulated by each reflective light modulator to the projection lens,
wherein the optical system includes:
a polarization beam splitter configured to guide each of first colored light as p-polarized light and second colored light as s-polarized light to a corresponding one of the reflective optical modulators, and to synthesize light fluxes modulated by the reflective optical modulators with each other;
a beam splitter arranged between the polarization beam splitter and the projection lens and configured to split the first colored light in accordance with a polarization direction of the first colored light and to transmit or reflect the second colored light irrespective of a polarization direction of the second colored light; and
a half-wave plate arranged between the polarization beam splitter and the beam splitter,
wherein the first colored light is light having a wavelength longer than that of the second colored light.

8. The projection display apparatus according to claim 7, further comprising, as a part of the plurality of reflective light modulators,
a first reflective light modulator modulating the first colored light transmitting the polarization beam splitter, and
a second reflective light modulator modulating the second colored light reflected by the polarization beam splitter.

9. An optical system configured to guide first colored light from a first laser light source to a first reflective light modulator configured to modulate the first colored light, second colored light from a second laser light source to a second reflective light modulator configured to modulate the second colored light, and third colored light from a third laser light source to a third reflective light modulator configured to modulate the third colored light, and to guide light modulated by the first, second, and third reflective light modulators to a projection lens that is configured to project the light to a target plane, the optical system comprising:
a first polarization beam splitter configured to emit in the same direction the first colored light from the first laser light source and the second colored light from the second laser light source which are incident upon the first polarization beam splitter from different directions;
a second polarization beam splitter configured to guide p-polarized light of the first colored light emitted from the first polarization beam splitter to the first reflective light modulator and s-polarized light of the second colored light emitted from the first polarization beam splitter to the second reflective light modulator, and to synthesize and emit the first and second light fluxes modulated by the first and second reflective light modulators with one each other; and
a combining prism configured to receive the first colored light and the second colored light emitted from the second polarization beam splitter, and the third colored light as s-polarized light emitted from the third laser light source from a direction opposite to an incident direction of the first colored light and the second colored light, the combining prism reflecting the first colored light and the second colored light to the projection lens, and the combining prism reflecting the third colored light to the third reflective light modulator and transmitting the third colored light modulated by the third reflective light modulator to the projection lens,
wherein the combining prism splits the first colored light in accordance with a polarization direction of the first colored light, splits the third colored light in accordance with a polarization direction of the third colored light, and reflects the second colored light irrespective of a polarization direction of the second colored light.

10. A projection display apparatus comprising:
a first reflective light modulator configured to modulate first colored light emitted from a first laser light source;
a second reflective light modulator configured to modulate second colored light emitted from a second laser light source;
a third reflective light modulator configured to modulate third colored light emitted from a third laser light source;
a projection lens configured to project the first colored light modulated by the first reflective light modulator, the second colored light modulated by the second reflective light modulator, and the third colored light modulated by the third reflective light modulator onto a target plane; and
an optical system configured to guide the first colored light from the first laser light source to the first reflective light modulator, the second colored light from the second laser light source to the second reflective light modulator, and the third colored light from the third laser light source to the third reflective light modulator, and to guide the first colored light modulated by the first reflective light modulator, the second colored light modulated by the second reflective light modulator, and the third colored light modulated by the third reflective light modulator to the projection lens,
wherein the optical system includes:
a first polarization beam splitter configured to emit in the same direction the first colored light from the first laser light source and the second colored light from the second laser light source which are incident upon the first polarization beam splitter from different directions;
a second polarization beam splitter configured to guide p-polarized light of the first colored light emitted from the first polarization beam splitter to the first reflective light modulator and s-polarized light of the second colored light emitted from the first polarization beam splitter to the second reflective light modulator, and to synthesize and emit the first and second light fluxes modulated by the first and second reflective light modulators with one each other; and
a combining prism configured to receive the first colored light and the second colored light emitted from the second polarization beam splitter, and the third colored light as s-polarized light emitted from the third laser light source from a direction opposite to an incident direction of the first colored light and the second colored light, the combining prism reflecting the first colored light and the second colored light to the projection lens, and the combining prism reflecting the third colored light to the third reflective light modulator and transmitting the third colored light modulated by the third reflective light modulator to the projection lens, wherein the combining prism splits the first colored light in accordance with a polarization direction of the first colored light, splits the third colored light in accordance with a polarization direction of the third colored light, and reflects the second colored light irrespective of a polarization direction of the second colored light.

11. An optical system configured to guide light modulated by a reflective light modulator to a projection lens configured to project the light onto a target plane, the optical system comprising:
- a polarization beam splitter configured to guide each of first colored light as p-polarized light and second colored light as s-polarized light to a corresponding one of reflective optical modulators that are different from each other, and to synthesize light fluxes modulated by the reflective optical modulators with each other;
- a beam splitter arranged between the polarization beam splitter and the projection lens and configured to split the first colored light in accordance with a polarization direction of the first colored light and to transmit or reflect the second colored light irrespective of a polarization direction of the second colored light; and
- a half-wave plate arranged between the polarization beam splitter and the beam splitter, wherein the second colored light is light of a blue wavelength range.

12. A projection display apparatus comprising:
- a plurality of reflective light modulators each configured to modulate light, the reflective light modulators being different from each other;
- a projection lens configured to project the light modulated by each reflective light modulator onto a target plane; and
- an optical system configured to guide the light modulated by each reflective light modulator to the projection lens, wherein the optical system includes:
- a polarization beam splitter configured to guide each of first colored light as p-polarized light and second colored light as s-polarized light to a corresponding one of reflective optical modulators that are different from each other, and to synthesize light fluxes modulated by the reflective optical modulators with each other;
- a beam splitter arranged between the polarization beam splitter and the projection lens and configured to split the first colored light in accordance with a polarization direction of the first colored light and to transmit or reflect the second colored light irrespective of a polarization direction of the second colored light; and
- a half-wave plate arranged between the polarization beam splitter and the beam splitter, wherein the second colored light is light of a blue wavelength range.

* * * * *